3,414,419
REFRACTORY RAMMING COMPOSITION

Grant M. Farrington, Jr., Marlton, N.J., and Frederic C. Verduin, Linthicum Heights, Md., assignors to General Refractories Company, Philadelphia, Pa., a corporation of Pennsylvania
No Drawing. Filed Oct. 3, 1966, Ser. No. 583,921
7 Claims. (Cl. 106—58)

ABSTRACT OF THE DISCLOSURE

A refractory ramming composition bonded with a bodied linseed oil in an amount of from about 1.5 to about 4%, by weight, based upon the weight of the composition.

---

The present invention relates to an improved refractory ramming composition for use in preparing monolithic structures for high temperature use in, for example, a furnace.

In basic oxygen steel-making furnaces, for example, a first refractory brick lining, referred to as the "tank" or "back-up" lining, is applied against the steel shell. This lining is usually about 4½" in thickness and is designed to last several campaigns. A second, much thicker, lining ranging from 18" to 30" in thickness, is then laid inside the tank lining. This lining, known as the "working" lining, is usually replaced after each campaign. The working lining is laid so that it turns a diameter small enough to leave a 1"–2" space between itself and the tank lining. This space is filled with a refractory ramming mix and this serves a three-fold purpose: (1) the space greatly facilitates the laying of the working lining since an exact outside diameter is not necessary; therefore, all joints between the brick can be made tight without regard to the exact outside diameter of the working lining. (2) At the end of the campaign the operator can observe when the working lining has been worn through and needs replacing by observing when an area occurs where no brick joints are visible. (3) The filled space serves as a protective barrier so that the tank lining is not damaged by erosion when the working lining wears through and it also protects the tank lining during removal of the worn-out working lining. The refractory ramming material with which the space between the linings is filled must possess certain qualities to be successful. First of all, the material, since it is in a confined space between the linings, must not contain water since steam would be generated which could dislodge the working lining upon heat-up. Secondly, the material must be readily pourable (granular, free-flowing) for emplacement in the 1"–2" space between the lining. In addition, the material must compact into a dense structure when rammed into place between the linings. Furthermore, the material must take a good set after heating and possess sufficient refractoriness and slag resistance to avoid damage to the tank lining after the working lining has been worn through. The material preferably also possesses sufficient shelf-life to permit shipment and storage prior to use. The use of refractory ramming mixes is not limited to the space between the working and tank linings. Such mixes may also be used as a filet at the intersection of the inner face of the working lining and the bottom of the furnace, in which case good mechanical strength of the set material is essential.

Presently available refractory ramming compositions satisfy some of these requirements but have several serious shortcomings which have led to the search for improved refractory ramming compositions. Such presently available ramming compositions are normally bonded with one or another of the coal tars having various melting or softening points. When a low melting tar is used, the composition flows freely into the space between the linings at room temperature, but the mix has very poor compacting properties. With tars of increasing melting points, the compacting properties become improved, but the mix is hard at room temperature and must be heated before using. This requires preliminarily heating the composition in a special heating room constructed on the plant site and removing the composition from this room just prior to use. If the composition is removed from the heated room too long before it is used, especially in cold weather, the composition will again become hard, necessitating reheating.

Regardless of which tar is used, however, they all evolve noxious fumes which are irritating to the skin and eyes of the workmen using the material.

It is the principal object of the present invention to provide an improved refractory ramming composition utilizing a non-aqueous bond.

It is another object of the present invention to provide an improved refractory ramming composition which can be used readily at room temperature or below (even at temperatures down to freezing) and requires no heating before use.

It is another object of the present invention to provide a refractory ramming composition that can be stored, without setting to an unworkable condition, for long periods of time.

It is a further object of the present invention to provide an improved refractory ramming composition which provides good cohesive bonds after ramming both at room temperature and after standing at slightly elevated temperatures.

A further important object of the present invention is to provide a refractory ramming composition, utilizing a nonaqueous bond, which does not evolve noxious fumes during use.

These and other objetcs will become apparent from a consideration of the following specification and claims.

The present invention comprises, in refractory ramming compositions bonded with organic bonding material, the improvement wherein said bonding material is bodied linseed oil in an amount from about 1.5 to about 4%, by weight, based on the weight of the composition.

As will appear hereinafter, the use of bodied linseed oil provides unexpected improvements over the use of the usual tars and even over the use of raw or boiled linseed oil. Raw and boiled linseed oil have been suggested for use as a bond in bricks (Patents No. 1,616,055 and 1,616,192).

Refactory ramming compositions are well known and consist of a mixture of finely-divided basic refractory material and the bonding material. The refractory material may be magnesia, as from dead burned magnesite; a mixture of magnesia and calcium oxide, as from burned dolomite; olivine, chrome ore, and the like. Some or all of these materials may be provided by crushed and ground brick scrap. As is well known, the refractory material will be relatively finely divided, substantially all thereof being smaller than ½", and preferably at least half thereof passing through a 6 mesh (Tyler) screen. Conventionally, a combination of coarse and fine material will be used, generally from about 40 to about 60%, by weight, resting on a 28 mesh screen and from about 40 to about 60%, by weight, passing a 28 mesh screen. The coarse material may be different chemically from the fine material.

The bonding agent employed in accordance with the present invention is, as stated, bodied, linseed oil. There are two forms of bodied linseed oil, one being known as heat-bodied linseed oil and the other being known as blown linseed oil. Heat-bodied linseed oil, as is well known, is prepared by heating linseed oil to temperatures of 525 to 625° F., whereby it gradually thickens without oxidation to a viscous, light, amber-colored liquid, having a viscosity in the range of Q to Z on the Gardner-Holt scale. Blown linseed oil, as is also well known, is produced by passing finely-divided bubbles of air through the oil at moderate temperatures, such as about 125° C., for considerable periods of time. The viscosity increases to the range of Q to Z on the Gardner-Holt scale, as the oil oxidizes, and the blown oil may have an oxygen content up to as high as 20%. In preparing blown oil, the reaction is mainly oxidation followed by polymerization of the oxidized molecules. Each of these forms of bodied linseed oil is to be distinguished from "boiled" linseed oil which normally refers to linseed oil prepared by adding small amounts of the oxides of manganese, lead or cobalt, or their naphthenates, resinates or linoleates to hot linseed oil. Bodied linseed oil having a Gardner-Holt viscosity of about X is preferred. Heat-bodied linseed oil is the preferred bodied oil for use in accordance with the present invention, since ramming compositions prepared using blown linseed oil in amounts in the upper portion of the above-mentioned range show signs of greater deterioration in texture on storage for one week at room temperature and also possess poorer compaction characteristics after standing at 105° F. overnight.

The exact amount of bodied linseed oil used will depend upon the particular bodied oil used; that is whether it is heat-bodied oil or blown oil, and whether the composition is to be used soon after preparation or is required to stand for extended periods, as in shipment and storage before use. When the composition is to be used soon after preparation, an amount of either blown linseed oil or heat-bodied linseed oil in the above-mentioned range of from about 1.5 to about 4%, by weight, based on the weight of the entire composition, can be used; however, even in this case heat-bodied linseed oil provides the better compaction characteristics. The shelf life of the compositions prepared from heat-bodied linseed oil generally is substantially better, particularly at elevated temperatures, than that of compositions prepared from blown linseed oil. Where good shelf life is a requirement, the amount of blown linseed oil, if used, should not be over about 3%, whereas the amount of heat-bodied linseed oil may go up to about 3.5%. Thus, heat-bodied linseed oil permits a wider latitude in amounts used and is, therefore, preferred from a manufacturing standpoint. The preferred amount of bodied linseed oil is from about 2 to about 3.5% based on the weight of the entire composition, and, when the bodied linseed oil is blown linseed oil, the amount thereof is preferably not over about 3%. A mixture of blown and heat-bodied linseed oil may be used.

In preparing the refractory ramming composition of this invention, the refractory material and bodied linseed oil are mixed together by well known means to facilitate dispersion of the liquid bonding material and to avoid lumping of the composition. This may be accomplished in conventional mixing apparatus. Advantageously, the oil is added gradually to the refractory material while the latter is being agitated, as by stirring.

The refractory ramming composition or mix of the present invention possesses many advantageous and improved properties. It has good pouring characteristics at all ambient temperatures even down to freezing, since the viscosity of the bonding material does not change appreciably with temperature. The composition has good compacting characteristics, good strength at elevated temperatures after setting, and it possesses at least as good resistance to temperature and slag attack as mixes heretofore available. The composition can be handled by workmen without discomfort since it does not evolve noxious and irritating fumes.

The invention will more readily be understood from a consideration of the following examples which are given for the purpose of illustration only and are not to be considered as limiting the scope of the invention in any way:

EXAMPLES 1–5

In these examples, refractory ramming mixes are prepared by mixing refractory aggregate coarses (dead-burned magnesite −6 +28 mesh), dead-burned magnesite fines (90% −200 mesh, 65% −325 mesh) and the designated bond material in proportions as set forth in the following Table I. The amount of bonding material was adjusted to give the best ramming characteristics. In measuring texture as set forth in the following Table I, the figures have the following meaning: 1=free flowing; 2=semi-hard, lumpy, not pourable; and 3=hard, unusable. The proportions of materials set forth in Table I are parts by weight.

TABLE I

|  | 1 | 2 | 3 | 4 | 5 |
|---|---|---|---|---|---|
| Coarses | 56.0 | 57.0 | 56.0 | 57.5 | 57.5 |
| Fines | 37.5 | 38.0 | 37.5 | 38.5 | 38.5 |
| RT-6 tar [1] | 6.5 | | | | |
| RT-8 tar [1] | | 5.0 | | | |
| RT-10 tar [1] | | | 6.5 | | |
| Raw linseed oil | | | | 4.0 | |
| Heat-bodied linseed oil | | | | | 4.0 |
| Cohesive bond after ramming: | | | | | |
| At room temperature | [2] | Poor | Poor | Poor | Good |
| After heating to 105° F. overnight | [2] | Poor | Good | Good | Good |
| Texture: | | | | | |
| After cooling to 30° F. overnight | 2 | 3 | 3 | 1 | 1 |
| At room temperature (70° F.) | 1 | 2 | 2 | 1 | 1 |
| After heating to 105° F. overnight | 1 | 1 | 1 | 1 | 1 |
| After 3 weeks at 70° F. (in closed container) | 1 | 2 | 2 | 3 | 1 |
| Odor | [3] | [3] | [3] | [4] | [4] |

[1] ASTM classification according to D 490-47.
[2] Very poor.
[3] Strong and noxious.
[4] Mild and non-irritating.

EXAMPLES 6–11

In these examples boiled linseed oil, blown linseed oil and heat-bodied linseed oil are compared as bonding agents. The compositions are prepared by mixing 60 parts, by weight, of double burned dolomite coarses (−6 +28 mesh), 40 parts of dead burned magnesite fines (90% −100 mesh, 65% −325 mesh) and the designated bond material in various percentages, by weight based upon the weight of the entire composition, all as set forth in the following Table II. In Table II compaction data are set forth for each mix. The compaction test involves placing 300 grams of the mix in a 2″ diameter cylinder mold. The mix at each end of the cylinder is then impacted ten times with a plunger activated by a 14 lb. weight falling two inches. This is done at room temperature (70° F.) and also after heating overnight to 105° F. The density of the compacted material, in pounds per cubic foot, is then calculated. Texture is also measured according to the scale used in Examples 1–5.

TABLE II

|  | 6 | 7 | 8 | 9 | 10 | 11 |
|---|---|---|---|---|---|---|
| Coarses | 60 | 60 | 60 | 60 | 60 | 60 |
| Fines | 40 | 40 | 40 | 40 | 40 | 40 |
| Boiled linseed oil, percent | 3 | 3.5 |  |  |  |  |
| Blown linseed oil, percent |  |  | 3 | 3.5 |  |  |
| Heat-bodied linseed oil, percent |  |  |  |  | 3 | 3.5 |
| Compaction (lbs./ft.³): |  |  |  |  |  |  |
| At room temperature | 160 | 166 | 147 | 141 | 151 | 147 |
| After heating to 105° F. overnight | 143 | 143 | 142 | 132 | 149 | 148 |
| Cohesive bond after ramming: At room temperature | (¹) | (¹) | Good | Good | Good | Good |
| Texture: After 1 week at 70° F. (in closed container) | 2 | 3 | 1 | 2 | 1 | 1 |

¹ Very poor.

The foregoing data show a large drop in density for the mix employing boiled linseed oil upon compacting after standing overnight at 105° F., showing that these mixes had set up to where they could not be compacted well. The data also show the advantage in using bodied linseed oil and the preference for heat-bodied linseed oil in providing the best combination of compacted density, cohesive bond and texture after storage.

Modification is possible in the selection of basic refractory material and sizing thereof without departing from the scope of the present invention.

What is claimed is:

1. In refractory ramming compositions bonded with organic bonding material, the improvement wherein said bonding material is bodied linseed oil in an amount from about 1.5 to about 4%, by weight, based on the weight of the composition.

2. The refractory ramming composition of claim 1 wherein said bodied linseed oil is in an amount from about 2 to about 3.5%.

3. The refractory ramming composition of claim 1 wherein said bodied linseed oil is heat-bodied linseed oil.

4. The refractory ramming composition of claim 1 wherein said bodied linseed oil is heat-bodied linseed oil in an amount from about 2 to about 3.5%.

5. The refractory ramming composition of claim 1 wherein said bodied linseed oil is blown linseed oil.

6. The refractory ramming composition of claim 5 wherein said blown linseed oil is present in an amount from about 2 to about 3.5%.

7. The refractory ramming composition of claim 6 wherein the blown linseed oil is present in an amount from about 2 to about 3%.

References Cited

UNITED STATES PATENTS 1,616,055 2/1927 Marks _____ 106—58
1,616,192 2/1927 Marks _____ 106—58

JAMES E. POER, *Primary Examiner.*